US009664273B2

(12) United States Patent
Mehl et al.

(10) Patent No.: US 9,664,273 B2
(45) Date of Patent: May 30, 2017

(54) STEERING COLUMN ASSIST SYSTEM (71) Applicant: STEERING SOLUTIONS IP HOLDING CORPORATION, Saginaw, MI (US)

(72) Inventors: Nicholas J. Mehl, Essexville, MI (US); Jeffrey E. Beyerlein, Frankenmuth, MI (US); Jason T. Rutkiewicz, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/669,138

(22) Filed: Mar. 26, 2015

(65) Prior Publication Data

US 2015/0197277 A1    Jul. 16, 2015

Related U.S. Application Data (63) Continuation-in-part of application No. 13/568,756, filed on Aug. 7, 2012, now Pat. No. 9,533,701.

(51) Int. Cl.
*B62D 5/04*    (2006.01)
*F16H 57/022*  (2012.01)
(Continued)

(52) U.S. Cl.
CPC ......... *F16H 57/022* (2013.01); *B62D 5/0409* (2013.01); *F16C 23/10* (2013.01);
(Continued)

(58) Field of Classification Search
CPC ...... B62D 5/04; B62D 5/0421; B62D 5/0454; B62D 5/0409; F16C 19/06; F16C 23/10;
(Continued)

(56) References Cited

U.S. PATENT DOCUMENTS

| 1,417,652 A | 5/1922 | Wood |
| 2,068,679 A | 1/1937 | Hokansson |

(Continued)

FOREIGN PATENT DOCUMENTS

| CN | 102083676 A | 6/2011 |
| CN | 102485570 A | 6/2012 |

(Continued)

OTHER PUBLICATIONS

Chinese Office Action for related Chinese Application No. 201310373128.8, Dated Jul. 6, 2015; 8 pages.

(Continued)

*Primary Examiner* — Anne Marie Boehler
(74) *Attorney, Agent, or Firm* — Cantor Colburn LLP (57) ABSTRACT

A power-assisted steering system includes an intermediate housing, a motor cone housing coupled to the intermediate housing, and a control shaft arranged along a control shaft axis for rotation about the control shaft axis. The system further includes an assist drive shaft arranged in a plane that is substantially transverse to the control shaft axis, the assist drive shaft being supported relative to the vehicle structure by a first bearing assembly and a second bearing assembly and defining a drive shaft axis, a worm disposed about the assist drive shaft, and a worm gear coupled to the control shaft. The worm gear and control shaft are configured for rotation about the control shaft axis.

19 Claims, 8 Drawing Sheets

(51) Int. Cl.
*F16H 55/24* (2006.01)
*F16C 23/10* (2006.01)
*F16H 57/021* (2012.01)
*F16C 19/06* (2006.01)

(52) U.S. Cl.
CPC .............. *F16H 55/24* (2013.01); *F16C 19/06* (2013.01); *F16C 2326/24* (2013.01); *F16C 2361/61* (2013.01); *F16H 2057/0213* (2013.01); *F16H 2057/0224* (2013.01)

(58) Field of Classification Search
CPC .................. F16C 2361/61; F16H 55/24; F16H 2057/0213; F16H 2057/0224
USPC .............. 180/444, 443; 74/388 PS, 425, 427
See application file for complete search history.

(56) References Cited

U.S. PATENT DOCUMENTS

| | | | |
|---|---|---|---|
| 2,069,143 A | 1/1937 | Hammond, Jr. et al. | |
| 4,035,044 A | 7/1977 | Miyazaki | |
| 4,569,423 A | 2/1986 | Hirano | |
| 4,666,317 A | 5/1987 | Holthoff | |
| 4,724,714 A * | 2/1988 | Iwasaki | B62D 3/12 74/396 |
| 6,164,407 A * | 12/2000 | Cheng | B62D 5/0403 180/443 |
| 6,357,313 B1 * | 3/2002 | Appleyard | B62D 5/0409 384/255 |
| 6,622,877 B2 | 9/2003 | Plass | |
| 6,763,738 B1 | 7/2004 | Tsutsui et al. | |
| 7,044,034 B2 | 5/2006 | Hsien | |
| 7,191,866 B2 * | 3/2007 | Sasaki | B62D 5/0424 180/443 |
| 7,413,052 B2 | 8/2008 | Sasaki et al. | |
| 7,455,149 B2 | 11/2008 | Segawa et al. | |
| 8,302,255 B2 | 11/2012 | Lin | |
| 8,950,280 B2 * | 2/2015 | Lescorail | F16H 57/022 384/255 |
| 2002/0179560 A1 | 12/2002 | Plass | |
| 2004/0149512 A1 | 8/2004 | Tsutsui et al. | |
| 2004/0245040 A1 | 12/2004 | Eda et al. | |
| 2005/0133297 A1 * | 6/2005 | Chikaraishi | B62D 5/0424 180/444 |
| 2005/0235768 A1 * | 10/2005 | Shimizu | B62D 5/0409 74/425 |
| 2005/0247514 A1 * | 11/2005 | Heitzer | F16H 7/14 180/444 |
| 2005/0268755 A1 | 12/2005 | Hsien | |
| 2007/0151378 A1 | 7/2007 | Bareis et al. | |
| 2007/0187169 A1 | 8/2007 | Sasaki et al. | |
| 2007/0251758 A1 | 11/2007 | Segawa et al. | |
| 2007/0295552 A1 * | 12/2007 | Watanabe | B62D 5/0403 180/444 |
| 2008/0149413 A1 * | 6/2008 | Kiforiuk | B62D 5/0409 180/444 |
| 2010/0140011 A1 * | 6/2010 | Wilkes | F16C 23/06 180/444 |
| 2011/0067946 A1 | 3/2011 | Kim | |
| 2014/0041957 A1 | 2/2014 | Cymbal et al. | |

FOREIGN PATENT DOCUMENTS

| | | |
|---|---|---|
| DE | 102005015451 A1 | 10/2006 |
| DE | 102007019324 A1 | 11/2007 |
| DE | 102011084510 A1 | 12/2012 |
| EP | 1452419 A1 | 9/2004 |
| EP | 1818242 A2 | 8/2007 |
| EP | 2695796 A2 | 2/2014 |
| JP | 2001322554 A | 11/2001 |
| KR | 20070116328 A | 12/2007 |
| WO | 2007144618 A1 | 12/2007 |

OTHER PUBLICATIONS

English Translation of Chinese Office Action for related Chinese Application No. 201310373128.8, Dated Jul. 6, 2015; 18 pages.
European Extended Search Report for EP Application No. 13179562.7 dated Mar. 15, 2016.
Extended European Search Report for EP Application No. 16162246.9 dated Aug. 22, 2016.

* cited by examiner

STEERING COLUMN ASSIST SYSTEM

CROSS REFERENCE TO RELATED APPLICATION

This application claims the benefit of U.S. patent application Ser. No. 13/568,756, filed Aug. 7, 2012, now U.S. Pat. No. 9,533,701 the contents of which are incorporated herein by reference thereto.

BACKGROUND OF THE INVENTION

The present invention relates generally to drive mechanisms for steering columns and more specifically to systems and methods for adjusting the position of a worm drive gear of a power assist steering system relative to a worm gear driven by the worm drive gear.

In many vehicles, a steering system includes a steering shaft (e.g., a steering wheel supported by a steering column and coupled to an intermediate steering shaft) whose rotation is linked to one or more steerable vehicle wheels. As the steering shaft is rotated, such as by an input from a vehicle operator or an automatic steering controller, the orientation of the one or more steerable vehicle wheels is changed so as to cause the direction of the vehicle to change. For example, vehicles commonly include a rack that is coupled to a pair of the vehicle's front wheels, with the rack being caused to move from side to side through the action of the intermediate steering shaft, which is caused to rotate about its central axis with rotation of the steering wheel.

Today's steering systems often include a power assist system to aid in rotating the intermediate steering shaft and therefore in moving the vehicle's steerable wheels from one orientation to another. In such systems, a torque assist system may include a hydraulic or electric drive mechanism (e.g., a torque-assist motor or pump) that applies a torque to a steering-assist drive shaft, causing the steering-assist drive shaft to rotate about its central axis. A worm may be disposed on the steering-assist drive shaft so as to facilitate application of a steering assist torque to a worm gear that is coupled to the intermediate steering shaft. The application of the torque assists in changing the orientation of the vehicle wheels. In such vehicle steering systems, which may include power assisted steering systems such as electric-assist power steering systems, the fit (i.e., meshing) between the worm and the worm gear can significantly impact the responsiveness and feel of the steering system as well as the amount of play (i.e., hysteresis) in the system. Accordingly, it is desirable to have a worm and worm gear combination with a close mesh (i.e., exhibiting small levels of clearance between gear teeth of the two components).

In production of large quantities of components, variations in critical dimensions may occur from one part to the next. As a result, without additional measures being taken to match individual components, undesirable variations in clearances between gear teeth of a particular worm and randomly chosen worm gear to be paired with that worm. To address such production variations, a number of techniques have been employed. One exemplary technique involves first assessing the dimensions (i.e., "sizing") individual worms and worm gears and then matching components to produce combinations with desirable fit characteristics (e.g., levels of clearance between the worm and teeth of the worm gear).

In accordance with this technique, worms may be machined to exacting tolerances and then classified into one of a plurality (e.g., twelve) of size classifications. Then, gears from complementary classes may be matched to produce combinations exhibiting desirable characteristics. Also, trial and error approaches may be used wherein gears are assembled, then removed, exchanged, and re-assembled until a desired fit is achieved. Unfortunately, these techniques can be costly, labor intensive, time consuming, and unreliable.

Accordingly, it would be desirable to have an improved system and method for assembling a worm and worm gear combination to produce a power-assisted steering system having a conveniently adjustable fit.

SUMMARY OF THE INVENTION

In an exemplary embodiment, a power-assisted steering system is provided. The power-assisted steering system includes an intermediate housing, a motor cone housing coupled to the intermediate housing, and a control shaft arranged along a control shaft axis for rotation about the control shaft axis. The system further includes an assist drive shaft arranged in a plane that is substantially transverse to the control shaft axis, the assist drive shaft being supported relative to the vehicle structure by a first bearing assembly and a second bearing assembly and defining a drive shaft axis, a worm disposed about the assist drive shaft, and a worm gear coupled to the control shaft. The worm gear and control shaft are configured for rotation about the control shaft axis, and the worm gear is configured for engaging the worm such that rotation of the worm and the assist drive shaft about the drive shaft axis causes rotation of the worm gear and the control shaft about the control shaft axis. The first bearing assembly is configured as an eccentric bearing assembly, a first portion of the assist drive shaft including the worm is disposed in the intermediate housing, and a second portion of the assist drive is disposed in the motor cone housing.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
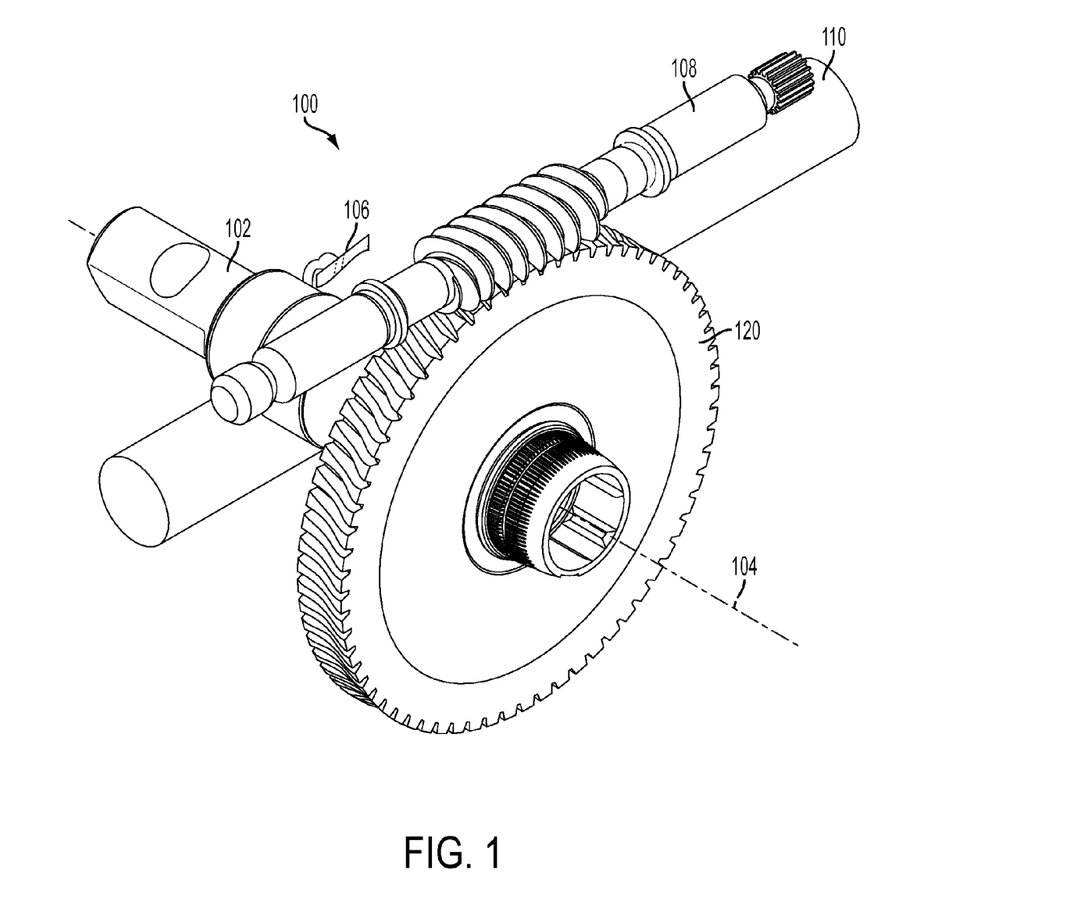
FIG. 1 illustrates a perspective view of a portion of an exemplary power-assisted steering system.

Referring now to the Figures, where the invention will be described with reference to specific embodiments, without limiting same, FIG. 1 illustrates a portion of an exemplary steering column assembly 100. As shown in FIG. 1, an exemplary power-assisted steering system 100 comprises a control shaft 102 that is arranged along a control shaft axis 104 and that is coupled to a vehicle structure 106 for rotation about the control shaft axis 104. An assist drive shaft 108 is arranged in an assist drive plane 110 that is substantially transverse to the control shaft axis 104. A worm gear 120 is coupled to (e.g., disposed on) the control shaft 102, and the worm gear 120 and control shaft 102 are configured for rotation about the control shaft axis 104. It should be appreciated that the worm gear 120 and control shaft 102 may be configured for rotation in response to a control input such as an operator-initiated rotation of an attached steering wheel, causing rotation of the control shaft 102 or the application of a torque upon the control shaft 102 by an automated steering control mechanism (not shown).

Figure 2:
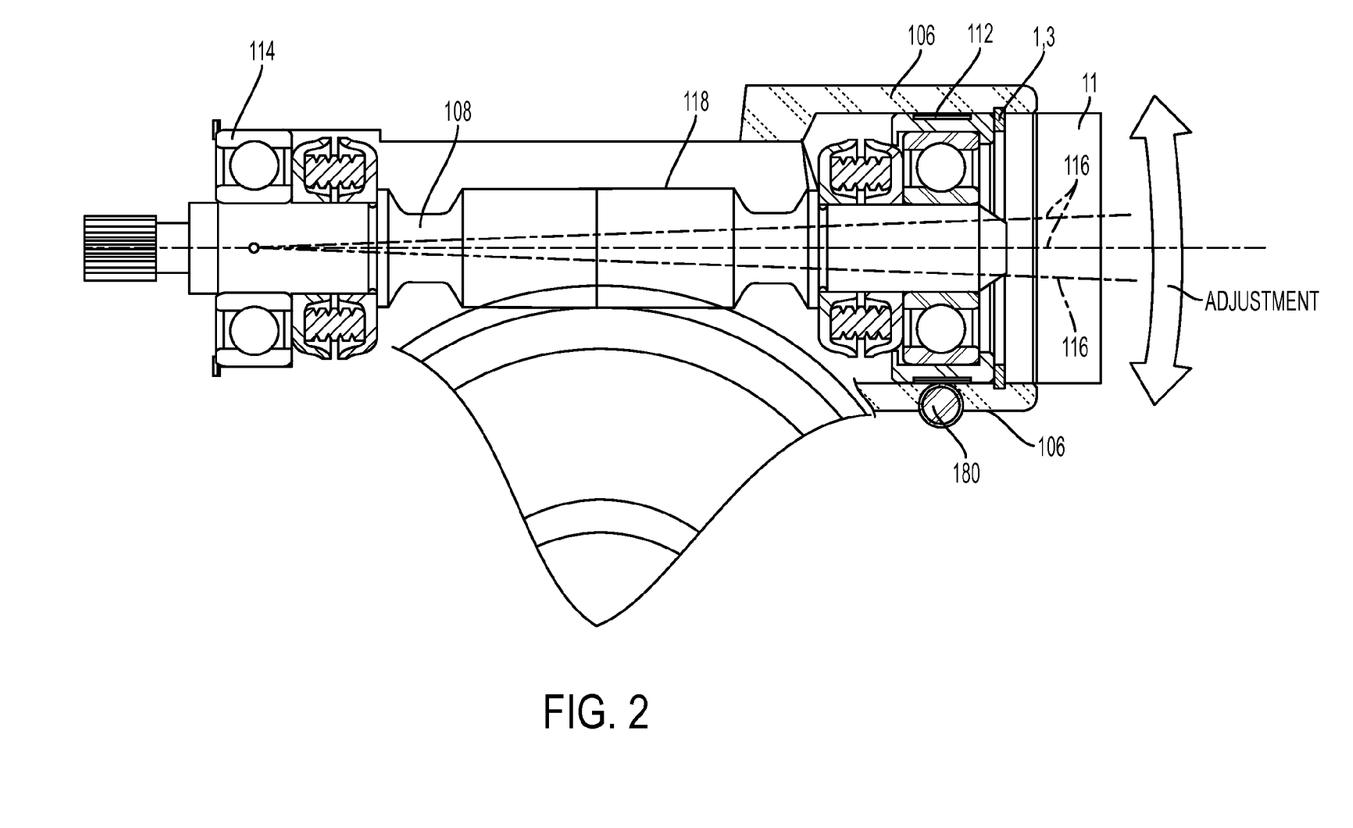
FIG. 2 illustrates a cutaway view of a portion of an exemplary power-assisted steering system.

As shown in FIG. 2, the assist drive shaft 108 is supported relative to the vehicle structure 106 by a first bearing assembly 112 and a second bearing assembly 114. The assist drive shaft 108 defines an assist drive shaft axis 116. A worm 118 is disposed, symmetrically about the assist drive shaft axis 116, on the assist drive shaft 108. In an exemplary embodiment, the worm 118 is disposed between the first bearing assembly 112 and the second bearing assembly 114.

As shown in FIG. 1, the worm 118 is configured for engaging the worm gear 120 such that rotation of the assist drive shaft 108, and therefore the worm 118, about the assist drive shaft axis 116, causes rotation of the worm gear 120, and therefore rotation of the control shaft 102, about the control shaft axis 104. In an exemplary embodiment, rotation of the control shaft 102 about the control shaft axis 104 causes a corresponding change in the orientation of at least one steerable vehicle wheel (nor shown).

Figure 3:
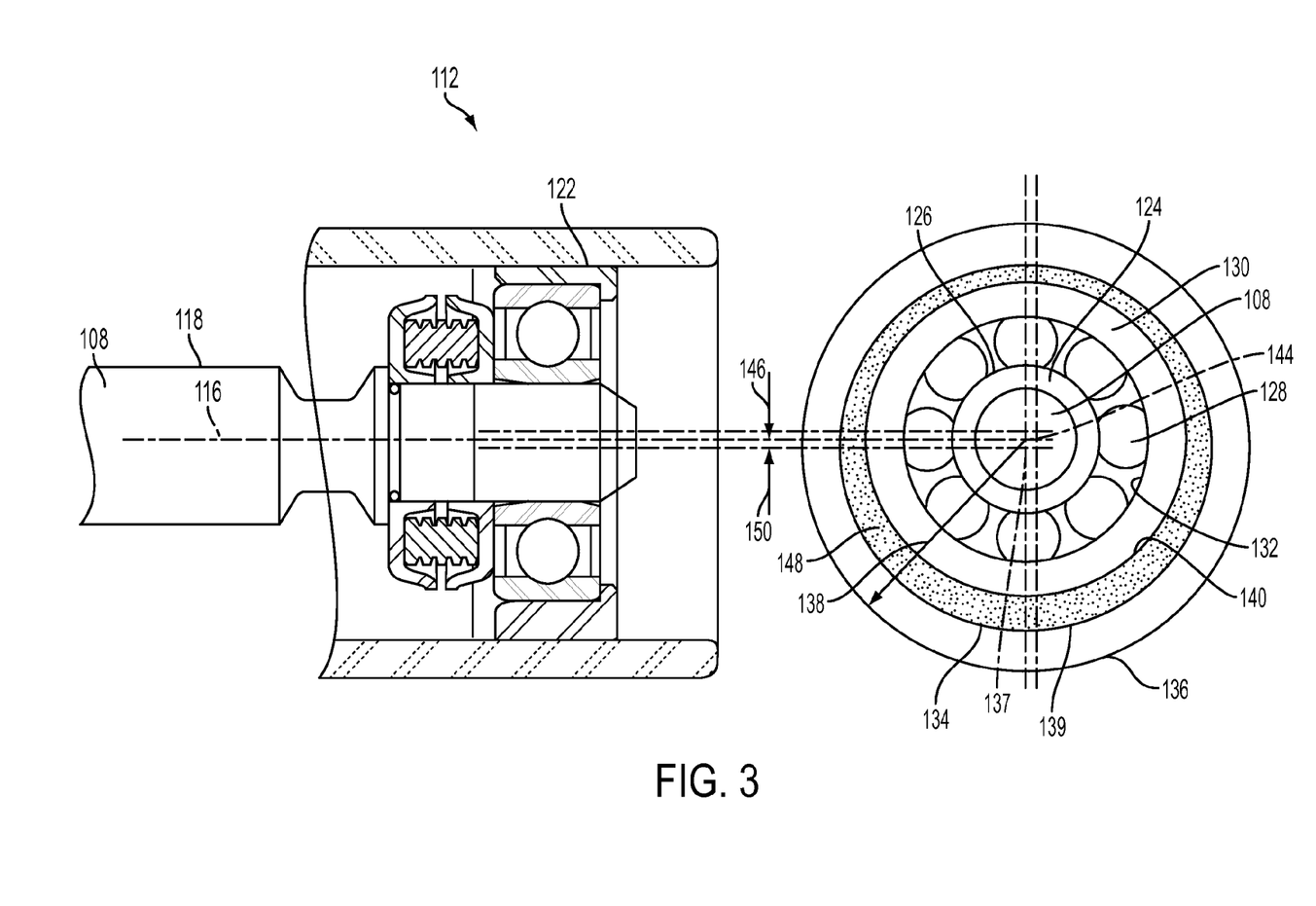
FIG. 3 illustrates a cutaway view of a portion of an exemplary power-assisted steering system.

As shown in FIG. 3, the first bearing assembly 112 is configured as an eccentric bearing assembly. Put another way, bearing assembly 112 is configured such that a position of an axis of rotation of the bearing assembly (i.e., the control shaft axis 104 about which the bearing assembly 112 is disposed and rotates) relative to an external surface 122 of bearing assembly 112 depends upon an angular orientation of one or more component of the bearing assembly. Accordingly, first bearing assembly 112 is configured such that the position of the axis of rotation 116 of the bearing assembly 112, relative to an external surface 122 of the bearing assembly 112, may be adjusted by modifying the orientation of one or more components of the bearing assembly 112. Since, in an exemplary embodiment, a position of the assist drive shaft axis 116 coincides with a position of the axis of rotation 116 of the first bearing assembly 112, and since the first bearing assembly 112 is configured as an eccentric bearing assembly, the position of the worm 118 in this embodiment may be adjusted by modifying the orientation of one or more components of the bearing assembly 112.

More specifically, in an exemplary embodiment as shown in FIG. 3, the first bearing assembly 112 is configured so as to maintain a position and orientation of the assist drive shaft axis 116 as the assist drive shaft 108 rotates about the assist drive shaft axis 116. The first bearing assembly 112 comprises a first bearing inner race 124, a first bearing 128, a first bearing outer race 130, and a first bearing housing 134. The first bearing inner race 124 is disposed about the assist drive shaft 108 and defines a radially-outward inner race surface 126 that has a substantially circular cross section disposed symmetrically about the assist drive shaft axis 116. The inner race surface 126 is suitable for facilitating movement of the first bearing 128 relative to and radially outward from the first bearing inner race 124 without causing substantial variation in the position of the assist drive shaft axis 116. It should be appreciated that the first bearing 128 may be any type of bearing known in the art, such as a ball bearing or a needle bearing or a roller bearing or a slide bearing. The first bearing outer race 130 is disposed radially outward from the first bearing 128 and defines a radially-inward outer race surface 132 that has a substantially circular cross section and that is also disposed symmetrically about the assist drive shaft axis 116.

The first bearing outer race 130 is disposed in a circular bearing receptacle 140 defined in the first bearing housing 134, which is configured to define an external mounting surface 136 for fixing a position of the first bearing housing 134, and the first bearing assembly 112, relative to the vehicle structure. The first bearing housing 134 is configured such that a center 144 of the circular bearing receptacle 140 is positioned apart from a ring center 137 of a round, radially outward surface 139 of an eccentric ring 148 of the first bearing housing 134. The eccentric ring 148 is rotatable about the assist drive shaft axis 116 and relative to the vehicle structure to which the first bearing housing 134 may be fixed. As a result, a radial distance 138 from the assist drive shaft axis 116 to the mounting surface 136 varies with position (i.e., angular orientation) about the assist drive shaft axis 116. Accordingly, a position of the assist drive shaft axis 116 relative to the vehicle structure can be adjusted by rotating the eccentric ring 148 of the first bearing housing 134 about the assist drive shaft axis 116.

In an exemplary embodiment, as shown in FIG. 3, the ability of the first bearing housing 134 to provide for adjustability of the radial distance 138 from the assist drive shaft axis 116 to the mounting surface 136 (e.g., by modulating the position (i.e., angular orientation) of the eccentric ring 148 about the assist drive shaft axis 116) causes the first bearing assembly 112 to operate as an eccentric bearing assembly. This adjustability of the position of the assist drive shaft axis 116 is facilitated by the first bearing housing 134 defining its circular bearing receptacle 140 about a center 144 that is apart from (i.e., separated a finite distance from) the ring center 137 of the radially outward surface 139 of the eccentric ring 148 of the first bearing housing 134.

In operation, as the eccentric ring 148 of the first bearing housing 134 is rotated about the ring center 137 of the radially outward surface 139 of the eccentric ring 148, the center 144 of the circular bearing receptacle 140 moves about the ring center 137 of the of the radially outward surface 139 of the eccentric ring 148, which corresponds to the center of the first bearing housing 134. Accordingly, a position of the assist drive shaft axis 116 relative to the vehicle structure can be adjusted by rotating the eccentric ring 148 of the first bearing housing 134 about the assist drive shaft axis 116. In this way, the eccentric bearing assembly 112 provides an adjustment range 146 for the assist drive shaft axis 116 and the worm 118 positioned thereon.

It should be appreciated that providing only a single eccentric ring 148 facilitates adjustments to the position of the assist drive shaft axis 116 in a first direction, such as the vertical direction 150, wherein the extent to which the position of the assist drive shaft axis 116 can be moved depends upon the adjustment range 146 (i.e., the extent of the eccentricity inherent in the first bearing housing 134). It should also be noted, however, that as the eccentric ring 148 of the first bearing housing 134 rotates about the assist drive shaft axis 116, the position of the assist drive shaft axis 116 moves not only along the vertical direction 150, but also in a direction that is perpendicular to the vertical direction 150. Accordingly, as first bearing housing 134 rotates about the assist drive shaft axis 116, in addition to changes in the position of the assist drive shaft axis 116 in the vertical direction 150, the assist drive shaft axis 116 also moves in a direction perpendicular to the vertical direction 150.

Figure 4:
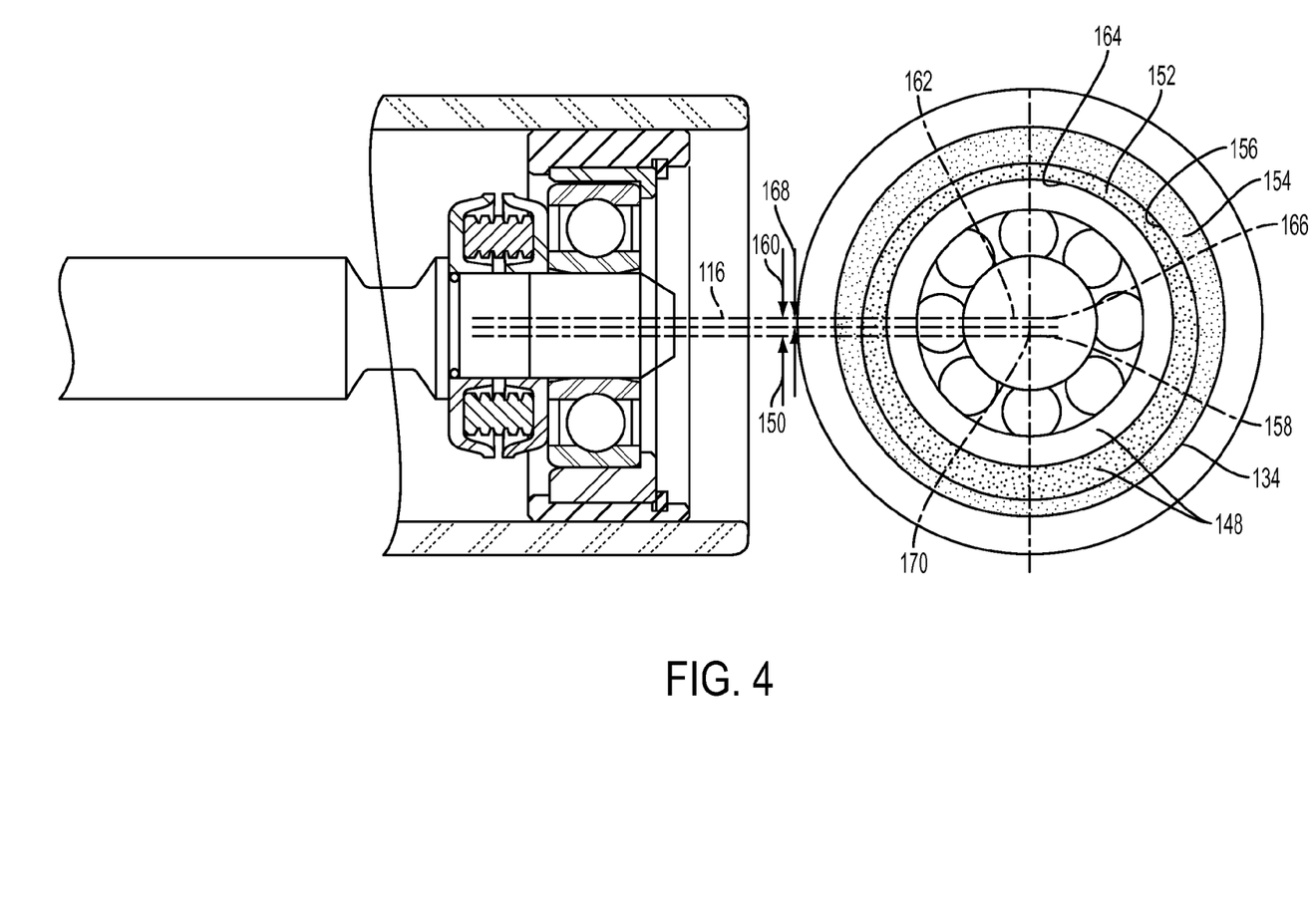
FIG. 4 illustrates a cutaway view of a portion of an exemplary power-assisted steering system.

To address the above-described coupling of movements of the assist drive shaft axis 116 in these two directions, in an exemplary embodiment as shown in FIG. 4, an exemplary first bearing housing 134 comprises a plurality of nested eccentric rings 148 (e.g., a double eccentric arrangement). This configuration facilitates accumulation of adjustment contributions made by each of the nested eccentric rings 148. Accordingly, deviations in a first direction, such as the vertical direction 150, may be reinforced by contributions in the vertical direction 150 from each of the nested eccentric rings 148, while contributions from each of the nested eccentric rings 148 in an orthogonal direction may be configured so as to oppose one another and cancel.

More specifically, as shown in FIG. 4, a first bearing housing 134 comprises a nested housing 152 and a nesting housing 154. The nesting housing 154 defines a circular nesting receptacle 156 disposed symmetrically about a nesting receptacle center 158. The nesting receptacle center 158 is positioned a finite distance 160 from a center 162 of the nesting housing 154 as defined by its radially outward circular surface. The nested housing 152 is disposed within the nesting receptacle 156 of the nesting housing 154. As the nesting housing 154 is rotated about the center 162 of the nesting housing 154, the nesting receptacle center 158, and the nested housing 152 disposed within the nesting receptacle 156 of the nesting housing 154, moves about the center 162 of the nesting housing 154.

The nested housing 152 defines a circular nested receptacle 164 disposed symmetrically about a nested receptacle center 166. The nested receptacle center 166 is positioned a finite distance 168 from a center 170 of the nested housing 152 as defined by its radially outward circular surface. As the nested housing 152 is rotated within the nesting housing 154, the nested receptacle center 166 moves about the center 170 of the nested housing 152. Accordingly, a first bearing housing 134 configured with a plurality of nested eccentric rings 148 may provide for cancellation of adjustment contributions in a first direction while reinforcing adjustment contributions in a second direction such as by rotating a nested housing in a different direction from that of a nesting housing.

It should be appreciated that the second bearing assembly 114 may also be configured as an eccentric bearing assembly. Accordingly, the system and method described herein facilitates adjustments to the position of the assist drive shaft axis 116 and the worm 118 positioned thereon.

Figure 5:
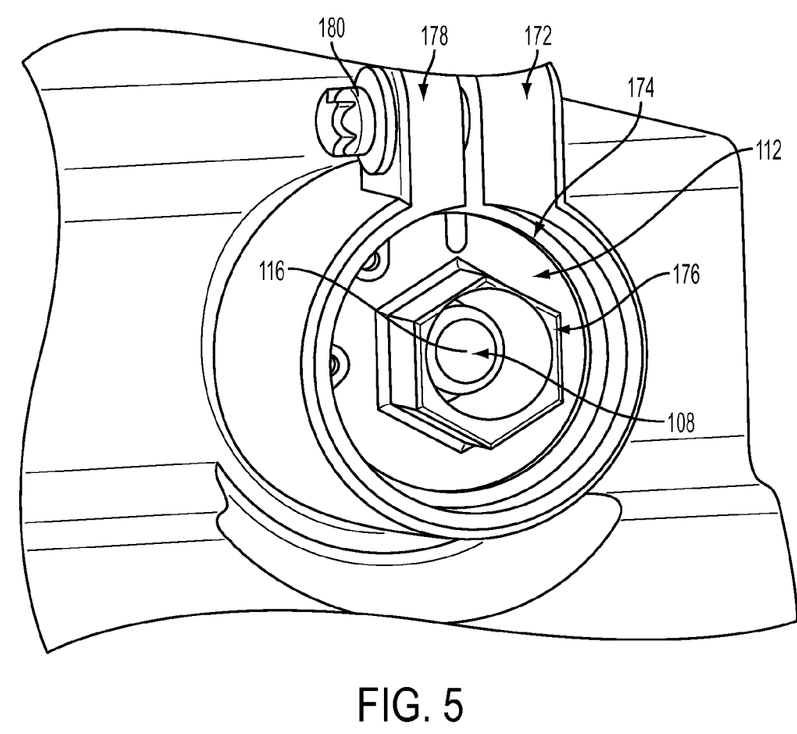
FIG. 5 illustrates a cutaway view of a portion of an exemplary power-assisted steering system.

As shown in FIG. 5, in an exemplary embodiment, a first bearing assembly 112 is retained within a steering-assist drive housing 172 by a snap ring 174. A hexagonal drive retainer 176 facilitates rotation of an eccentric ring 148 (FIG. 1) and adjustment of a position of a worm 118 (disposed on an assist drive shaft 108 (FIG. 1) relative to a worm gear 120 (FIG. 1). While the hexagonal drive retainer 176 is used to facilitate rotation of the eccentric ring 148 (FIG. 3), the assist drive shaft 108 (FIG. 1) is driven by a steering assist motor (not shown) until a predetermined criteria relating to the proper positioning of the worm is met. Exemplary criteria include achievement of a desired clearance between the worm 118 and the worm gear 120, achievement of a desired level of force between the worm gear 120 and the worm 118, or achievement desired level of effort (i.e. resistance torque) due to the interaction between the worm 118 and the worm gear 120. Once the desired criteria is met, a clamp 178 is activated so as to fix the position of the of the eccentric ring 148 (FIG. 3) and the assist drive shaft axis 116 (FIG. 1) relative to the control shaft axis 104 and therefore the position of the worm 118 relative to the worm gear 120. Axial force of the worm 118 along the assist drive shaft axis 116 is resisted by the snap ring 174.

In an exemplary embodiment, various mechanisms may be implemented to facilitate adjustment of the eccentric ring 148. For example, a bolt 180 may be configured so as to facilitate manipulation of the eccentric ring 148. In accordance with one such embodiment, the eccentric ring 148 is configured with a series of teeth arranged around its circumference positioned so as to interact with the threads of the bolt 180. As the bolt is rotated, the threads of the bolt interact with the teeth of the eccentric ring 148, causing it to rotate. In an exemplary embodiment, the mesh of the bolt 180 to the eccentric ring 148 is configured to provide a 110:1 drive ratio, which has been found to provide a relatively smooth and reliable method of adjusting the eccentric ring with precision.

In operation, in an adjustment mode, the nut is engaged to the bolt 180 with only minimal torque so that the bolt 180 remains free to rotate. Once the worm 118 and bearing 112 are installed into the steering-assist drive housing 172, the worm 118 is rotated by the motor (not shown) while the bolt 180 is also rotated, causing the eccentric ring 148 to rotate, which causes the position of the worm 118 to be adjusted. Once the desired position of the eccentric ring 148 and the worm 118 are obtained, the nut is driven, relative to the bolt 180, to a sufficient torque to fix the position of the eccentric ring 148.

FIGS. 6-10 illustrate an exemplary power-assisted steering system 200 that is similar to steering system 100 except that it includes a mechanism housing 250, an intermediate housing 260, and a motor cone housing 280. In the embodiment shown, mechanism housing 250 is integrally formed with intermediate housing 260. However, housings 250, 260 may be formed separately and coupled thereafter. The eccentricity described herein is integrated into motor cone housing 280, which reduces components from the embodiments of FIGS. 1-5. System 200 allows for easy adjustment and sealing of the eccentricity between the motor interface in motor cone housing 280 and a bearing assembly 212 supporting an assist drive shaft 208. It includes no external features that allow the eccentric adjustment system to be changed, which may be required for underhood applications.

Figure 7:
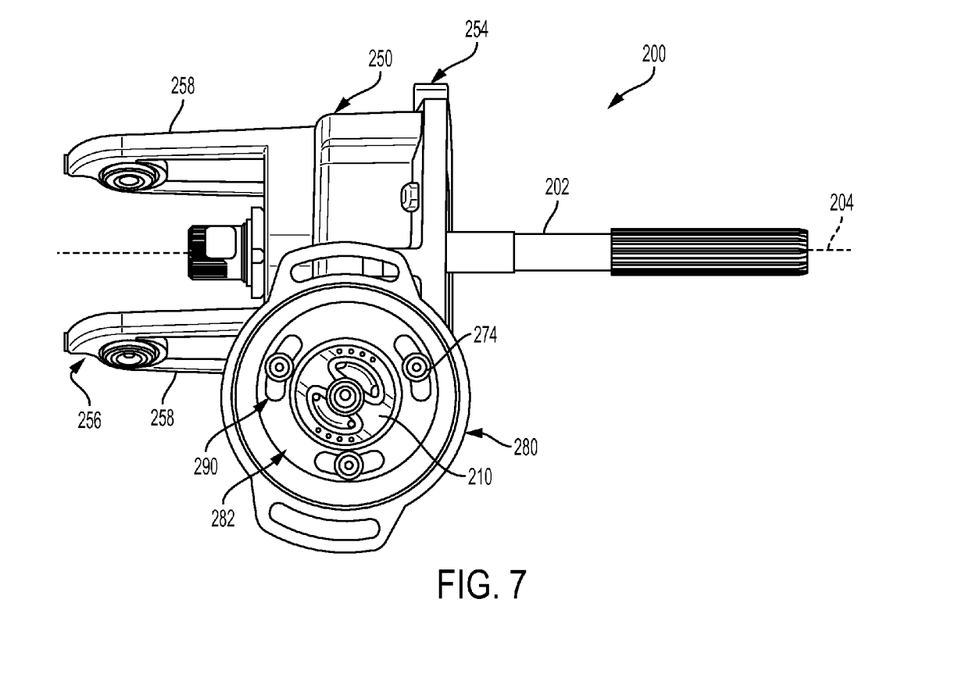
FIG. 7 is a side view of an exemplary power-assisted steering system.
Figure 8:
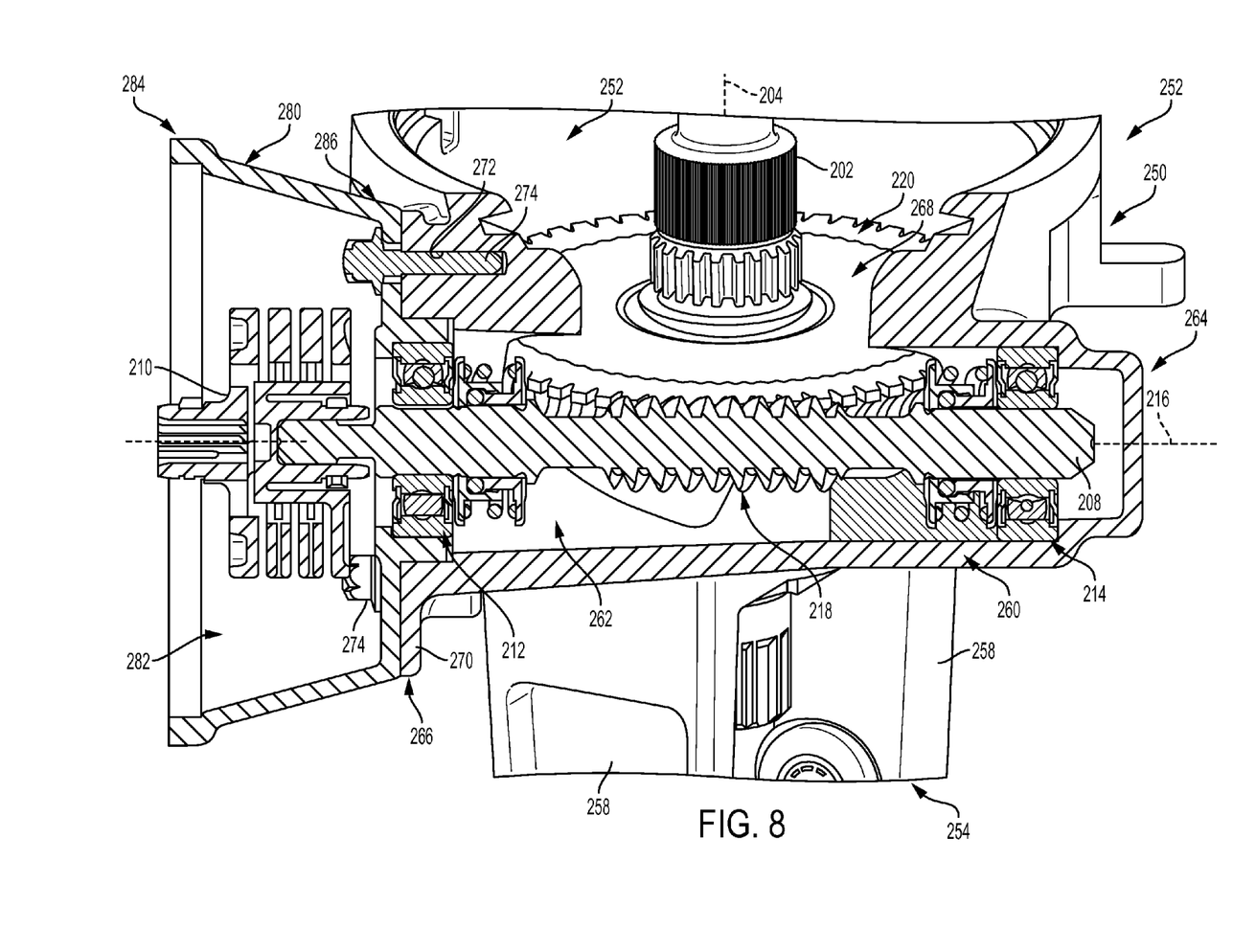
FIG. 8 is a cutaway view of a portion of an exemplary power-assisted steering system.

As shown in FIGS. 7 and 8, steering system 200 includes a control shaft 202 that is arranged along a control shaft axis 204 and that is coupled to a vehicle structure (e.g., mechanism housing 250) for rotation about control shaft axis 204. The assist drive shaft 208 is arranged in an assist drive plane that is substantially transverse to the control shaft axis 204. A worm gear 220 is coupled to (e.g., disposed on) the control shaft 202, and the worm gear 220 and control shaft 202 are configured for rotation about the control shaft axis 204. It should be appreciated that the worm gear 220 and control shaft 202 may be configured for rotation in response to a control input such as an operator-initiated rotation of an attached steering wheel, causing rotation of the control shaft 202 or the application of a torque upon the control shaft 202 by an automated steering control mechanism (not shown).

Figure 9:
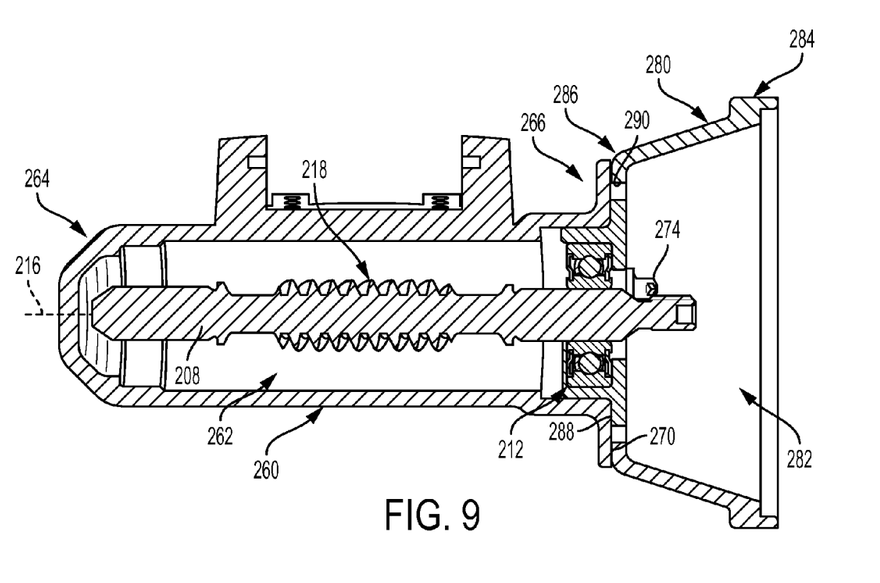
FIG. 9 is a cutaway view of a portion of an exemplary power-assisted steering system.
Figure 10:
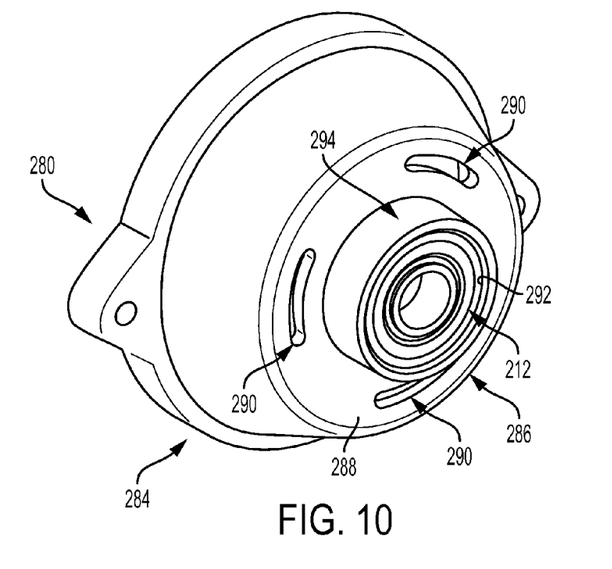
FIG. 10 is a perspective view of a portion of an exemplary power-assisted steering system.

As illustrated in FIGS. 8 and 9, the assist drive shaft 208 is supported relative to the vehicle structure by the first bearing assembly 212 and a second bearing assembly 214. In the exemplary embodiment, first bearing assembly 212 is configured as an eccentric bearing assembly having the same or similar structure and function as those described herein such as the first bearing assembly 112, and as illustrated in FIGS. 2-4.

The assist drive shaft 208 defines an assist drive shaft axis 216. A worm thread 218 is disposed, symmetrically about the assist drive shaft axis 216, on the assist drive shaft 208. In an exemplary embodiment, the worm thread 218 is disposed between the first bearing assembly 212 and the second bearing assembly 214.

The worm thread 218 is configured for engaging the worm gear 220 such that rotation of the assist drive shaft 208, and therefore the worm 218, about the assist drive shaft axis 216, causes rotation of the worm gear 220, and therefore rotation of the control shaft 202, about the control shaft axis 204. In an exemplary embodiment, rotation of the control shaft 202 about the control shaft axis 204 causes a corresponding change in the orientation of at least one steerable vehicle wheel (not shown).

Figure 6:
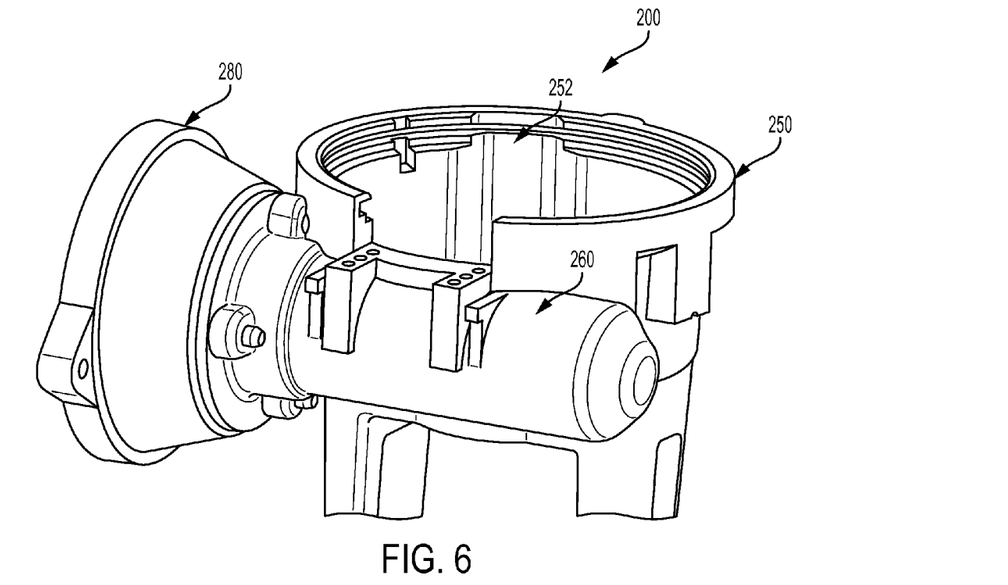
FIG. 6 illustrates a perspective view of exemplary housings of an exemplary power-assisted steering system.

As shown in FIGS. 6-8, mechanism housing 250 defines an interior cavity 252 and includes a first end 254 and a second end 256. Interior cavity 252 receives and houses worm gear 220 and a portion of control shaft 202. First end 254 is configured to couple to a steering column (not shown), and second end 256 includes a pair of mounting flanges 258 configured to the vehicle main structure (e.g., cross car beam).

As shown in FIGS. 6, 8, and 9, intermediate housing 260 is an elongated housing that defines an interior cavity 262 and includes a first end 264, a second end 266, and a passage 268 (FIG. 8). Interior cavity 262 receives and houses assist drive shaft 208, first bearing assembly 212, and second bearing assembly 214 (FIG. 8). Passage 268 allows a portion of worm gear 220 to extend into interior cavity 262 to meshingly engage worm 218.

Housing first end 264 is sealed to enclose assist drive shaft 208 and second bearing assembly 214 to prevent debris or contaminants from entering intermediate housing 260. Housing second end 266 includes a flange 270 having a plurality of apertures 272 (FIGS. 6 and 8) to receive a fastener 274. Flange 270 is configured to couple to motor cone housing 280.

In the exemplary embodiment, motor cone housing 280 defines an interior cavity 282 and includes a first end 284 and a second end 286. Interior cavity 282 receives and houses a portion of assist drive shaft 208. A coupler 210 is coupled between assist drive shaft 208 and a motor (not shown), which is configured to transmit rotary motion to shaft 208 through coupler 210. In other embodiments, the motor may be directly coupled to drive shaft 208. As illustrated, motor cone housing 280 is generally conical.

Housing first end 284 is open and is configured to couple to a motor housing (not shown). Second end 286 includes a sealing wall 288 defining a plurality of elongated apertures 290 and an inner wall 292 that defines a bearing seat 294. Sealing wall 288 is configured to be disposed against flange 270 to seal housing second end 286 and enclose assist drive shaft 208 and first bearing assembly 212 within intermediate housing 260 and motor cone housing 280 to prevent debris or contaminants from entering housings 260, 280 and interfering with steering system 200.

Motor cone housing 280 is coupled to intermediate housing 260 by inserting fasteners 274 through aligned apertures 272 and elongated apertures 290. However, motor cone housing 280 may be coupled to intermediate housing 260 by other methods (e.g., welding). In the exemplary embodiment, elongated apertures 290 enables motor cone housing 280 to be rotatably adjustable relative to flange 270 to provide a proper orientation therebetween and to rotationally and axially account for the eccentricity.

In the embodiment illustrated in FIGS. 6-10, the eccentric ring of first bearing assembly 212 is adjusted by rotating motor cone housing 280, and thus a motor shaft therein, relative to intermediate housing 260 that retains bearing assembly 212.

Thus, the present invention provides improved systems and methods for assembling a worm and worm gear combination to produce a power-assisted steering system having a conveniently adjustable fit. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power-assisted steering system, comprising:
an intermediate housing having a housing first end and a housing second end including a flange;
a motor cone housing having a first end, a second end having a sealing wall that abuts the flange of the intermediate housing, and a bearing seat
a control shaft arranged along a control shaft axis for rotation about the control shaft axis;
an assist drive shaft arranged in a plane that is substantially transverse to the control shaft axis, the assist drive shaft being supported relative to the vehicle structure by a first bearing assembly and a second bearing assembly and defining a drive shaft axis, the first bearing assembly engages the bearing seat and the sealing;
a worm disposed about the assist drive shaft; and
a worm gear coupled to the control shaft, the worm gear and control shaft being configured for rotation about the control shaft axis, the worm gear configured for engaging the worm such that rotation of the worm and the assist drive shaft about the drive shaft axis causes rotation of the worm gear and the control shaft about the control shaft axis, the first bearing assembly configured as an eccentric bearing assembly, a first portion of the assist drive shaft including the worm is disposed in the intermediate housing, and a second portion of the assist drive shaft is disposed in the motor cone housing.

2. A power-assisted steering system as in claim 1, wherein the intermediate housing includes a sealed first end and a second end, wherein the second end is sealed by the motor cone housing.

3. A power-assisted steering system as in claim 2, wherein the flange includes a first plurality of apertures, and the sealing wall includes a second plurality of apertures configured for alignment with the first plurality of apertures.

4. A power-assisted steering system as in claim 3, further comprising a plurality of fasteners inserted through the aligned first and second plurality of apertures to couple the motor cone housing to the intermediate housing.

5. A power-assisted steering system as in claim 4, wherein the second plurality of apertures are elongated apertures configured to allow rotation of the motor cone housing relative to the flange to adjust the eccentric bearing assembly.

6. A power-assisted steering system as in claim 1, wherein the sealing wall includes an inner wall defining the bearing seat, wherein the first bearing assembly is disposed in the seat.

7. A power-assisted steering system as in claim 1, further comprising a coupling coupled to an end of the assist drive shaft, the coupling configured to couple to a motor.

8. A power-assisted steering system as in claim 1, further comprising a mechanism housing coupled to the intermediate housing, wherein the control shaft and the worm gear are disposed in the mechanism housing, and wherein a portion of the worm gear extends into the intermediate housing.

9. A power-assisted steering system as in claim 8, wherein the mechanism housing includes a first end and a second end having a pair of mounting flanges.

10. A power-assisted steering system as in claim 1, wherein the worm is disposed between the first bearing assembly and the second bearing assembly.

11. A power-assisted steering system as in claim 1, wherein the worm gear is disposed on the control shaft.

12. A power-assisted steering system as in claim 1, wherein the worm gear and the control shaft are configured for rotation in response to a control input.

13. A power-assisted steering system as in claim 1, wherein the worm gear and the control shaft are configured for rotation in response to driver rotation of a steering wheel.

14. A power-assisted steering system as in claim 1, wherein a position of the control shaft axis depends upon an orientation of one or more components of the first bearing assembly.

15. A power-assisted steering system as in claim 1, wherein the second bearing assembly is configured as an eccentric bearing assembly.

16. A power-assisted steering system as in claim 1, wherein the assist drive shaft is arranged in a plane that is substantially transverse to the control shaft axis.

17. A power-assisted steering system as in claim 1, wherein rotation of the control shaft about the control shaft axis causes a corresponding change in an orientation of at least one steerable vehicle wheel.

18. A power-assisted steering system as in claim 1, wherein the first bearing assembly is configured such that a position of the control shaft axis relative to an external surface of the first bearing assembly depends upon an orientation of one or more components of the first bearing assembly.

19. A power-assisted steering system as in claim 1, wherein the first bearing assembly is configured such that a position of the worm may be adjusted by modifying an orientation of one or more components of the first bearing assembly.

\* \* \* \* \*